UNITED STATES PATENT OFFICE.

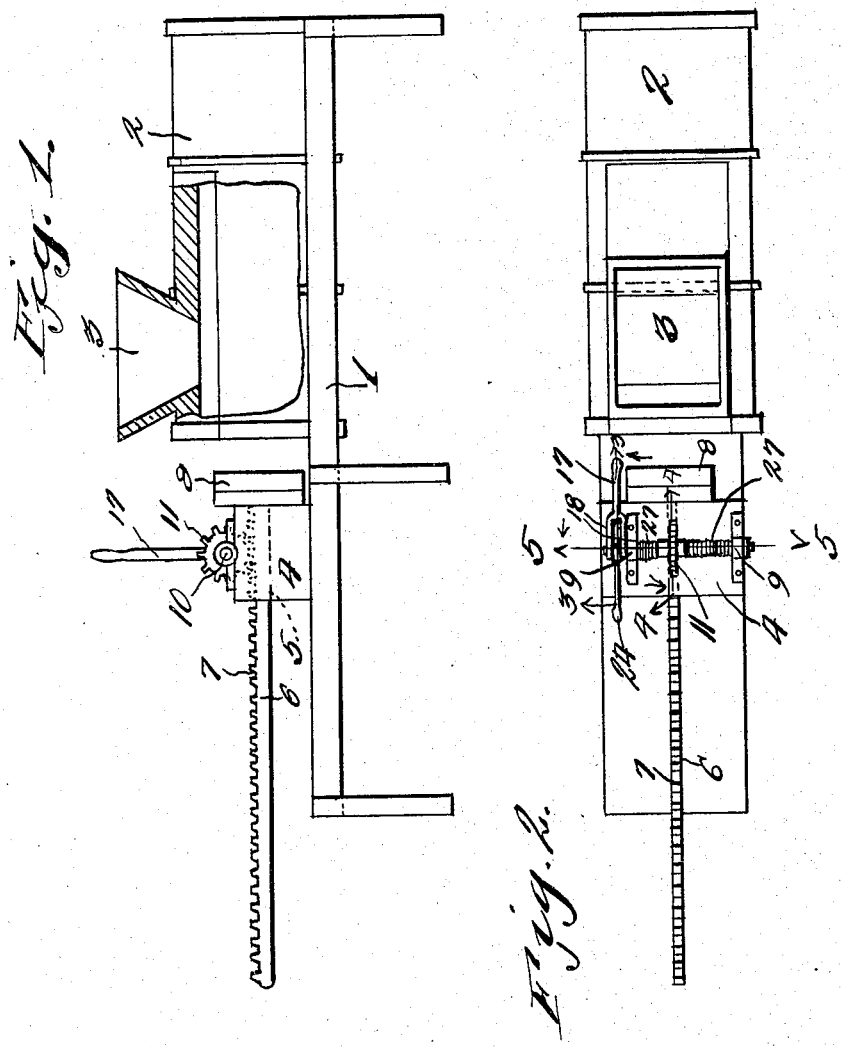

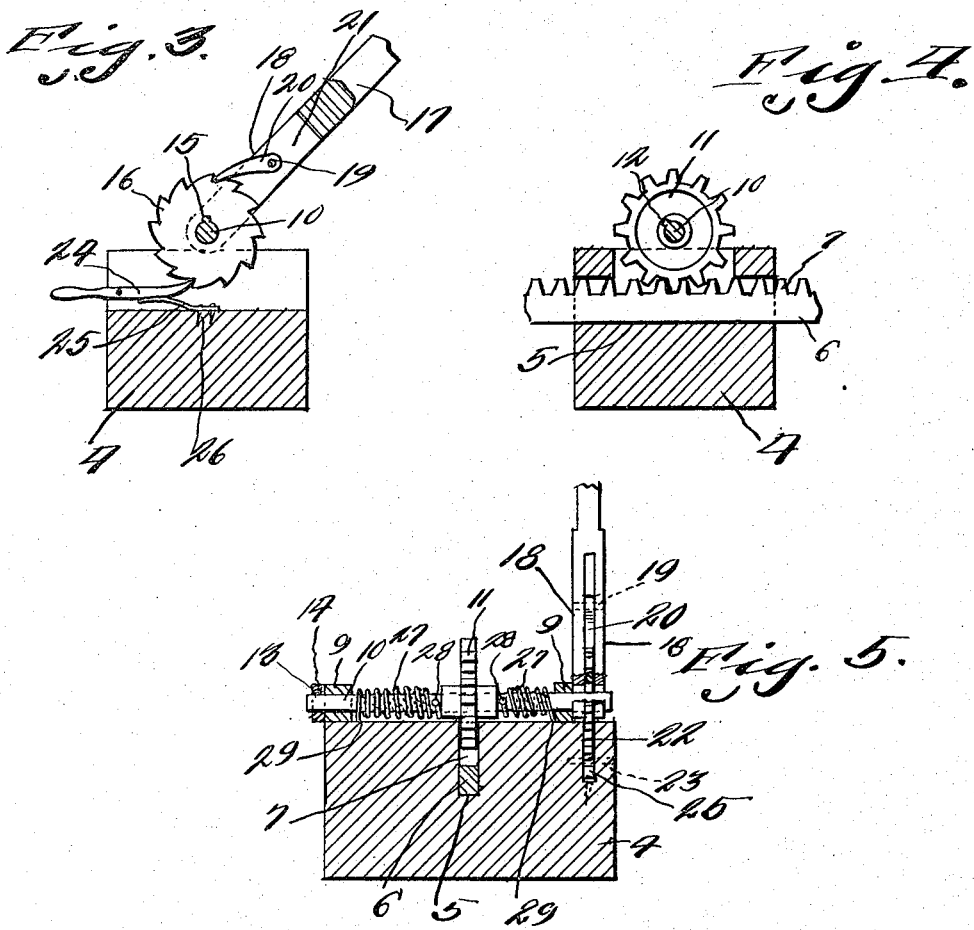

GEORGE EDWARD McCANN, OF RIDGEWAY, WISCONSIN.

CHEESE-PRESS.

1,217,969.     Specification of Letters Patent.     Patented Mar. 6, 1917.

Application filed January 11, 1916. Serial No. 71,523.

*To all whom it may concern:*

Be it known that I, GEORGE EDWARD MCCANN, a citizen of the United States, residing at Ridgeway, in the county of Iowa, State of Wisconsin, have invented a new and useful Cheese-Press; and I do hereby declare the following to be a full, clear, and exact description of the invention, such as will enable others skilled in the art to which it appertains to make and use the same.

This invention relates to the art of presses, more particularly to cheese presses, and more especially to a type, in which a reciprocating plunger, operating in the pressing cylinder, is employed for compressing the cheese in said cylinder.

One of the objects of the invention is to provide ratchet feeding means for intermittently operating a revoluble shaft, which in turn has gear connections with the plunger bar, so as to feed upon the bar forwardly, thereby causing the plunger head to press the cheese in the cylinder.

Another object of the invention is the provision of spring means on the operating revoluble shaft, for returning the revoluble shaft to its initial position, thereby withdrawing the plunger head from the pressing cylinder.

In practical fields the details of construction may necessitate alterations, falling within the scope of what is claimed.

The invention comprises further features and combination of parts, as hereinafter set forth, shown in the drawings and claimed.

In the drawings:

Figure 1 is a view in side elevation of a cheese press constructed in accordance with the invention.

Fig. 2 is a top plan view of the cheese press.

Fig. 3 is a sectional view through the ratchet mechanism.

Fig. 4 is a sectional view through the gear mechanism on line 4—4 of Fig. 2.

Fig. 5 is a transverse sectional view on line 5—5 of Fig. 2.

Referring more especially to the drawings, 1 designates a supporting frame, upon which the cheese pressing cylinder 2 having a hopper 3 is supported. Mounted on the frame 1 is a bearing block 4 having a guide 5, in which the plunger bar 6 is guided. The plunger bar 6 is supplied with rack teeth 7 and the plunger head 8. Mounted in bearings 9 on the top of the bearing block is a revoluble shaft 10, and rotatable with the shaft is a gear 11, the teeth of which mesh with the teeth 7 of the plunger bar, so that when the intermittent revoluble shaft is operated (to which the gear 11 is keyed at 12), the plunger bar is moved forwardly, so that the plunger 8 will move into the pressing cylinder intermittently, thereby firmly compressing the cheese into a compact body. Upon one end of the shaft 10 a collar 13 is fastened by a pin 14, to insure the shaft against axial movement. Keyed at 15 to the other end of the shaft 10 is a ratchet wheel 16. An operating lever 17 is provided, the lower end of which is bifurcated, which causes the formation of the forks 18, which are disposed upon opposite sides of the ratchet wheel 16, the free ends of the forks being pivoted upon the shaft 10. Mounted transversely of the forks is a pin 19, on which a pawl 20 is pivoted. This pawl 20 is operable in the bifurcation 21, and as shown, engages the teeth of the ratchet 16. It is to be noted that the ratchet operates partially in a recess 22 of the bearing block 4, and pivoted near the lower portion of the recess 22 upon the pivot pin 23 is a detent lever 24, there being a suitable spring 25 secured at 26 in the crotch of the recess 22, and designed to bear against the under portion of the detent lever 24, to hold the same in engagement with the teeth of the ratchet 16. It is evident that the teeth of the ratchet, the pawl 20, and the detent lever 24 are so arranged relatively with regard to each other that upon movement of the operating lever forwardly, the ratchet 16 is partially rotated, the detent lever 24 acting to prevent retrogression of the ratchet, upon the backward movement of the operating lever 17, the shaft 10 is partially rotated. Therefore upon continuous forward and backward movement of the lever 17, the shaft 10 will be intermittently moved or rotated, thereby feeding the plunger step by step into the pressing cylinder, in order to compress the cheese. Surrounding the shaft 10 are coil springs 27, which are upon opposite sides of the gear 11. The inner end of each spring 27 is connected at 28 to the shaft 10, and the outer end of each spring is secured at 29 to the upper face of the bearing block. In practice the springs 27 should be of sufficient diameter, in order to be tensioned upon full movement of the plunger bar. Subsequently to moving the plunger 8 forwardly to its limit, the pawl 20 and the detent 24 may be disengaged from the teeth of the ratchet, in which case the springs (which are put under tension upon forward movement of the plunger) will instantly act to move the plunger bar rearwardly, and withdraw the plunger 8 from the cylinder, to its initial position in contact with the bearing block, after which the compressed cheese may be removed in the usual or conventional manner.

The member 4 not only constitutes a bearing member for the plunger bar 6, but also a guide therefor, owing to the guide opening 5 (which is formed through the member) being rectangular in cross section, thereby preventing twisting of the plunger bar. Furthermore, the roof or top of the guide opening adjacent the forward and rear faces of said member 4, as well as the bottom of said opening, prevent the plunger bar from oscillating, using the gear 11 as a fulcrum. Further, this member 4 also constitutes an abutment, against which the plunger head abuts, when the plunger bar is reversed or moved rearwardly incident to the actions of the springs 27, thereby limiting the plunger head and preventing injury to the other parts of the machine. A further advantage is that after the plunger head has been moved to its limit into the cheese pressing chamber or receptacle, the lever 17 may be thrown rearwardly, in order to be supported by the member 4. While the lever 17 is in such a position, the pawl 20 may be disengaged from the ratchet 16. Then, when it is desired to allow the plunger to return to its initial position, the handle end of the detent lever 24 may be raised against the action of the spring 25, thereby releasing the ratchet and allowing the actions of the springs 27 to rotate the revoluble shaft 10, to return the plunger head to the positions shown in Figs. 1 and 2, the member 4 acting as an abutment and limiting said head, thereby relieving injury to the operating parts of the plunger bar. It is to be noted that when releasing the ratchet 16 to permit the actions of the springs to return the plunger bar, the lever 17 is supported on the member 4, thereby making it unnecessary to hold the lever 17 by hand, while the plunger head is returning. Moreover, when the lever 17 is so supported by the member 4 and the pawl is out of engagement with the ratchet, said pawl may hang downwardly, and it will be noted that the pawl is so positioned on the lever relative to its pivot and substantially correspondingly to the distance between said pivot and the rear face of the member 4, that the free end of said pawl may engage a portion of the handle end of said lever 24, in order to hold the other end of said lever 24 in engagement with the teeth of the ratchet. However, when it is desired to disengage the lever 24 from the ratchet, the handle end of said detent lever is tilted upwardly partially, which will also tilt the lever 17 upwardly. It is to be noted that when the plunger bar is being moved so as to feed the plunger head by imparting an intermittent motion to the lever 17, the pawl 20 will automatically disengage from the ratchet through the medium of gravitation, when the lever 17 is oscillated rearwardly. When the lever 17 is moved forwardly, the pawl 20 will automatically reëngage the ratchet through the medium of gravitation, thereby eliminating all means to manipulate the pawl manually, which has been found a disadvantage over the present means.

The invention having been set forth, what is claimed as new and useful is:

In a cheese press, the combination of a frame and a cheese presser cylinder thereon at one end and provided with a hopper, of a combined bearing and abutment block on said frame adjacent the entrance end of said cylinder and provided with an opening rectangular in cross section and axially alined with the center of said cylinder, a shaft mounted on said block transversely thereof, bearings therefor, a gear keyed on said shaft centrally between its ends, the top of the block having an opening through which the gear operates whereby its teeth extend into the first opening, a plunger bar guided in the first opening and having teeth to be engaged by the teeth of the gear, said first opening acting as means to prevent twisting and oscillatory movement of said bar, one end of the plunger bar having a plunger head operable into said cylinder to compress the cheese therein, said block having a transverse groove at one end, a ratchet keyed on one end of the shaft and extending into said groove, a spring tensioned detent lever pivoted in the groove to engage said ratchet, a lever pivoted on said shaft and provided with means to automatically engage and disengage said ratchet to impart an intermittent motion to the same and said shaft when an intermittent motion is imparted to said lever, to feed the plunger head into the cylinder, and spring means on said shaft put under tension when feeding the head into the cylinder, to impart a reverse movement to said shaft, when the detent lever is disengaged from the ratchet, whereby the head may be returned to its initial position and abut against said block.

In testimony whereof I have signed my name to this specification in the presence of two subscribing witnesses.

GEORGE EDWARD McCANN.

Witnesses:
GENEVA JARVIS,
S. H. JARVIS.

Copies of this patent may be obtained for five cents each, by addressing the "Commissioner of Patents, Washington, D. C."